(12) United States Patent
Brusselle et al.

(10) Patent No.: US 8,728,971 B2
(45) Date of Patent: May 20, 2014

(54) PRESSURE CONTROL OF THE CATALYST MIXING VESSEL

(75) Inventors: Alain Brusselle, Wilrijk (BE); Daan Dewachter, Mechelen (BE); Louis Fouarge, Dilbeek (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/812,731

(22) PCT Filed: Jul. 29, 2011

(86) PCT No.: PCT/EP2011/063143
§ 371 (c)(1),
(2), (4) Date: Jan. 28, 2013

(87) PCT Pub. No.: WO2012/013802
PCT Pub. Date: Feb. 2, 2012

(65) Prior Publication Data
US 2013/0130891 A1   May 23, 2013

(30) Foreign Application Priority Data

Jul. 30, 2010   (EP) .................................. 10171367

(51) Int. Cl.
*B01J 31/00*   (2006.01)
*G05D 16/02*   (2006.01)
*C08F 4/76*   (2006.01)
*B01J 21/00*   (2006.01)

(52) U.S. Cl.
USPC ............................ 502/152; 502/100; 422/122

(58) Field of Classification Search
None
See application file for complete search history.

(56) References Cited

U.S. PATENT DOCUMENTS

| 4,370,997 A * | 2/1983 | Braithwaite et al. ....... 137/116.3 |
| 2008/0039596 A1 | 2/2008 | Fouarge |
| 2009/0318637 A1 | 12/2009 | Siraux et al. |

FOREIGN PATENT DOCUMENTS

EP   1563902 A1   8/2005

* cited by examiner

*Primary Examiner* — Melvin C Mayes
*Assistant Examiner* — Douglas Call

(57) ABSTRACT

The present invention relates to a process for preparing catalyst slurry in a catalyst slurry preparation system and supplying catalyst slurry to an ethylene polymerization loop reactor wherein an accurate control of the pressure within said catalyst slurry preparation system is provided. More particularly, the present invention provides a method for preparing a catalyst slurry and supplying said catalyst slurry to an ethylene polymerization loop reactor, said catalyst slurry comprising solid catalyst and a liquid hydrocarbon diluent, wherein said method comprises the steps of:

(a) feeding concentrated catalyst slurry to a mixing vessel by means of a feeding device;
(b) diluting said concentrated catalyst slurry in a suitable amount of said diluent in a mixing vessel thereby obtaining a diluted catalyst slurry having a concentration suitable for use in an ethylene polymerization reaction; wherein said mixing vessel is provided with at least one pressure regulating unit connected therewith and wherein said pressure regulating unit comprises a pulsation dampener; and
(c) transferring said diluted catalyst slurry from said mixing vessel to said ethylene polymerization loop reactor; characterized in that the method comprises the step of maintaining said mixing vessel essentially free of a gaseous phase by regulating the pressure in said mixing vessel using said at least one pressure regulating unit comprising the pulsation dampener.

20 Claims, 3 Drawing Sheets

PRESSURE CONTROL OF THE CATALYST MIXING VESSEL

CROSS-REFERENCE TO RELATED APPLICATIONS

This application claims the benefit of PCT/EP2011/063143, filed Jul. 29, 2011, which claims priority from EP 10171367.5, filed Jul. 30, 2010.

TECHNICAL FIELD OF THE INVENTION

The present invention relates to a process for preparing catalyst slurry in a catalyst slurry preparation system and supplying catalyst slurry to an ethylene polymerization loop reactor wherein an accurate control of the pressure within said catalyst slurry preparation system is provided. More particularly, the invention relates to a process for regulating the pressure in a catalyst slurry preparation system comprising a mixing vessel which is maintained in a liquid full state. The catalysts that can be prepared and supplied using the present invention include chromium, Ziegler-Matta and metallocene catalysts.

BACKGROUND OF THE INVENTION

Polyolefin such as polyethylene (PE) is synthesized by polymerizing ethylene ($CH_2$=$CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Olefin polymerizations such as ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed therefrom, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene, comprise chromium catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reactor. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions. While in the art, much attention has been paid to quantity, quality and the type of catalyst utilized during a polymerization reaction, methods for improving or optimizing regulatory conditions in a catalyst slurry preparation system and/or the preparation of catalyst slurry have received less attention. There remains however a need in the art to provide methods for regulating conditions within a catalyst slurry preparation system and during the preparation of catalyst slurry.

SUMMARY OF THE INVENTION

The present invention provides a method for preparing and supplying a catalyst slurry to an ethylene polymerization loop reactor, wherein said catalyst slurry is prepared in a catalyst slurry preparation system, and wherein an accurate control of the pressure within said catalyst slurry preparation system is provided. More particularly, the catalyst slurry preparation system comprises a catalyst mixing vessel. The present invention provides a method for regulating the pressure within a catalyst slurry preparation system, and in particular to a method wherein at least this catalyst mixing vessel is maintained in a liquid full state. Furthermore, the present invention also relates to a catalyst slurry preparation system adapted for maintaining the catalyst mixing vessel in a liquid full state. The method and catalyst slurry preparation system according to the present invention therefore overcome at least some of the herein-mentioned problems. The present invention provides an accurate control of the pressure by providing the system with pressure regulating unit enabling to keep the catalyst mixing vessel in a liquid full state.

In a first aspect, the present invention relates to a method for preparing a catalyst slurry and supplying said catalyst slurry to an ethylene polymerization loop reactor, said catalyst slurry comprising solid catalyst and a liquid hydrocarbon diluent, wherein said method comprises the steps of:

(a) feeding concentrated catalyst slurry to a mixing vessel by means of a feeding device;

(b) diluting said concentrated catalyst slurry in a suitable amount of said diluent in a mixing vessel thereby obtaining a diluted catalyst slurry having a concentration suitable for use in an ethylene polymerization reaction; and (c) transferring said diluted catalyst slurry from said mixing vessel to said ethylene polymerization loop reactor; characterized in that the method comprises the step of maintaining said mixing vessel essentially free of a gaseous phase by regulating the pressure in said mixing vessel by means of at least one pressure regulating unit comprising a pulsation dampener.

Preferably, the present invention provides a method for preparing a catalyst slurry and supplying said catalyst slurry to an ethylene polymerization loop reactor, said catalyst slurry comprising solid catalyst and a liquid hydrocarbon diluent, wherein said method comprises the steps of:

(a) feeding concentrated catalyst slurry to a mixing vessel by means of a feeding device;

(b) diluting said concentrated catalyst slurry in a suitable amount of said diluent in a mixing vessel thereby obtaining a diluted catalyst slurry having a concentration suitable for use in an ethylene polymerization reaction; wherein said mixing vessel is provided with at least one pressure regulating unit connected therewith and wherein said pressure regulating unit comprises a pulsation dampener; and (c) transferring said diluted catalyst slurry from said mixing vessel to said ethylene polymerization loop reactor; characterized in that the method comprises the step of maintaining said mixing vessel essentially free of a gaseous phase by regulating the pressure in said mixing vessel using said at least one pressure regulating unit comprising the pulsation dampener.

More in particular, the present invention provides a method wherein said mixing vessel remains (is maintained) in a liquid full state during the entire process of catalyst slurry preparation and supply.

In a preferred embodiment, the invention provides a method comprising the step of regulating the pressure in said mixing vessel at a pressure which is below the pressure of the reactor and which is higher than the vapour pressure of said diluted catalyst slurry.

In another embodiment, the invention provides a method comprising the step of maintaining the pressure in said mixing vessel during the preparation of said diluted catalyst slurry at a pressure which is lower than the pressure in said feeding device for concentrated catalyst slurry and wherein the pressure in said feeding device for concentrated catalyst slurry is lower than the pressure in said ethylene polymerization loop reactor.

In another embodiment, a method is provided comprising the step of maintaining the pressure in said mixing vessel at a pressure which is below 35 bar, preferably below 25 bar, more preferably below 17 bar.

In another embodiment, the invention provides a method comprising the step of maintaining said diluted catalyst slurry in said mixing vessel at a pressure comprised between 3 and 35 bar, preferably between 3 and 25 bar, preferably between 3 and 17 bar and maintaining said concentrated catalyst slurry in said mud pot at a pressure comprised between 5 and 35 bar, preferably between 5 and 25 bar, preferably between 5 and 17 bar.

In another embodiment, the invention provides a method comprising the step of keeping said pressure in said mixing vessel at a substantially constant level during the preparation of said diluted catalyst slurry and/or during the supply of said diluted catalyst slurry to said ethylene polymerization loop reactor.

In a preferred embodiment, the invention provides a method wherein step (a) comprises the steps of:

(a1) providing concentrated catalyst slurry in a mud pot; and (a2) transferring said concentrated catalyst slurry from said mud pot to a mixing vessel through a conduit.

The invention provides a method wherein said catalyst is a Ziegler-Natta, chromium or a metallocene catalyst. Preferably said catalyst is a metallocene catalyst. In another embodiment a method is provided wherein said diluent is isobutane.

According to another aspect, the present invention relates to a system for preparing a catalyst slurry and supplying catalyst slurry to an ethylene polymerization loop reactor, said catalyst slurry consisting of solid catalyst and liquid hydrocarbon diluent, comprising:

a feeding device for feeding concentrated catalyst slurry to a mixing vessel;

a mixing vessel comprising catalyst slurry, preferably diluted catalyst slurry;

at least one conduit operably connected to said mixing vessel and to said ethylene polymerization loop reactor for transferring said diluted catalyst slurry from said mixing vessel to said ethylene polymerization loop reactor, characterized in that said system is provided with at least one pressure regulating unit for maintaining said mixing vessel essentially free of a gaseous phase, wherein said pressure regulating unit comprises a pulsation dampener. In an embodiment, said pressure regulating unit further comprises a pressure controlling valve, a pressure measuring device.

Preferably, the present invention also encompasses a system for preparing a catalyst slurry and supplying catalyst slurry to an ethylene polymerization loop reactor, said catalyst slurry consisting of solid catalyst and liquid hydrocarbon diluent, comprising:

a feeding device for feeding concentrated catalyst slurry to a mixing vessel (3);

a mixing vessel (3) comprising a catalyst slurry; wherein said mixing vessel (3) is provided with at least one pressure regulating unit (74) connected therewith and wherein said pressure regulating unit comprises a pulsation dampener; for maintaining said mixing vessel (3) essentially free of a gaseous phase;

at least one conduit (4) operably connected to said mixing vessel (3) and to said ethylene polymerization loop reactor (1) for transferring said diluted catalyst slurry from said mixing vessel (3) to said ethylene polymerization loop reactor (1).

In accordance with the invention, regulation of the pressure within catalyst slurry preparation system and in particular within the mixing vessel of the catalyst slurry preparation system using a pressure regulating unit as indicated above, permits to accurately control the conditions at which the catalyst slurry is prepared. The mixing vessel which is under pressure control according to the present method and system can therefore be kept in a liquid full state. This has the advantage that the catalyst slurry in the mixing vessel can be much easier transferred towards the polymerization reactor. For this transfer, pumping means, e.g. pumps, are provided on the conduits connecting the mixing vessel with the polymerization reactor. In an embodiment, for optimal operation of the pumping means, the mixing vessel is provided with pressure regulating unit to keep the vessel in a liquid full state. This pressure regulating unit is provided on the mixing vessel (connected therewith) and/or on a conduit relaying a mud pot containing concentrated catalyst slurry with this mixing vessel. Such pressure regulating unit comprises a pressure controlling valve, a pressure measuring device and a pulsation dampener.

These and further aspects and embodiments of the invention are hereunder further explained in the following sections and in the claims, and illustrated by non-limiting figures.

Figure 1:
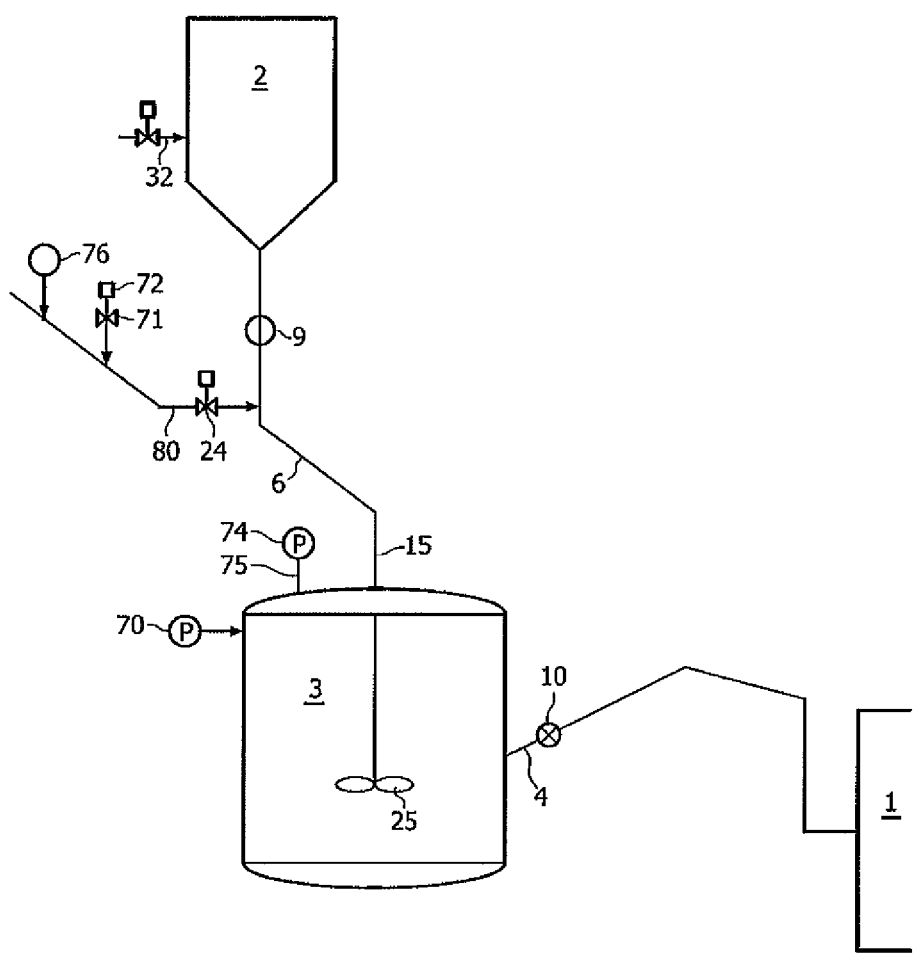
FIG. 1 schematically illustrates an embodiment of a catalyst slurry preparation system for preparing and feeding catalyst slurry to an ethylene polymerization reactor.

The constructional details of valves, pumps etc. have been omitted in the figures for clarity, it being within the skill of the art to supply these.

DETAILED DESCRIPTION OF THE INVENTION

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may be used in the practice or testing of the present invention, the preferred methods and materials are now described.

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of". The recitation of numerical ranges by endpoints includes all numbers and fractions subsumed within the respective ranges, as well as the recited endpoints. The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed. All documents cited in the present specification are hereby incorporated by reference in their entirety.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Catalyst is introduced into an ethylene polymerization reactor in the form of a catalyst slurry prepared in a catalyst slurry preparation system. The present invention relates to a process for preparing catalyst slurry in a catalyst slurry preparation system and supplying catalyst slurry to an ethylene polymerization loop reactor wherein an accurate control of the pressure within said catalyst slurry preparation system is provided. The pressure control of one or more parts of said catalyst slurry preparation system, and more preferably the pressure control of the liquid full mixing vessel results in an efficient pumping of the catalyst slurry to the reactor with neglectable amounts of air that are transferred to the polymerization reactor. Furthermore, the pressure regulation unit eliminates pressure build up in the mixing vessel.

Furthermore, pressure regulation provides advantageously avoids leakage of catalyst slurry from the mixing vessel towards the mud pot(s) or towards the polymerization reactor.

In an embodiment of the present method, said pressure regulating unit comprises a pressure controlling valve, and a pressure measuring device.

In a particular embodiment, said mixing vessel is provided with at least one pressure regulating unit connected therewith.

In an embodiment, said feeding device comprises at least one mud pot for containing a concentrated catalyst slurry and at least one conduit operably connected to said mixing vessel and to said mud pot for transferring said concentrated catalyst slurry from said mud pot to said mixing vessel. Preferably, said conduit for transferring said concentrated catalyst slurry from said mud pot to said mixing vessel is provided with at least one pressure regulating unit. More preferably, said conduit for transferring said concentrated catalyst slurry from said mud pot to said mixing vessel is provided with flushing means which is connected to said pressure regulating unit.

As used in the present invention, the term "catalyst slurry" refers to a composition comprising catalyst solid particles and a diluent. The solid particles can be suspended in the diluent, either spontaneously or by homogenization techniques, such as mixing. In the present invention it is especially applicable to solid particles of ethylene polymerization catalyst in a liquid diluent, e.g. isobutane. These slurries will be referred to herein as ethylene polymerization catalyst slurries.

By the term "solid particles" it is meant a solid provided as a collection of particles, such as for instance a powder or granulate. In the present invention it is especially applicable to a catalyst provided on a carrier or support. The support is preferably a silica (Si) support.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts. In the present invention it is especially applicable to ethylene polymerization catalysts such as metallocene catalysts, chromium catalysts and Ziegler-Matta catalysts. Whereas a "catalyst slurry" refers herein to a composition comprising catalyst solid particles and a diluent, "catalyst" refers herein to the catalyst molecules either as such or provided on a carrier or support.

Catalyst slurry according to the invention consists or consists essentially of solid catalyst, such as those given above, and a liquid hydrocarbon diluent. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present description that other diluents may as well be applied according to the present invention.

In an embodiment, the present invention is directed to the control of the pressure within a catalyst slurry preparation system. As used herein the term "catalyst slurry preparation system" refers to a device or system wherein catalyst slurry as defined herein is prepared. Said catalyst preparation system in connected to a polymerization loop reactor for supply of the prepared catalyst slurry to the reactor.

In an exemplary embodiment, the catalyst slurry preparation system comprises i) one or more mud pots containing catalyst slurry; ii) at least one mixing vessel wherein catalyst slurry is diluted to a concentration suitable for use in a polymerization reaction; iii) one or more conduits, each conduit connecting a mud pot to a mixing vessel and permitting to transfer catalyst slurry from the mud pot to the mixing vessel, and iv) one or more conduits connecting the mixing vessel to a polymerization reactor for transferring the diluted catalyst slurry to the polymerization reactor. The latter conduits may be provided with pumping means, e.g. pumps, for pumping the catalyst slurry from the mixing vessel to a polymerization reactor.

As the mixing vessel is maintained in a liquid full state during the preparation of catalyst slurry, no or almost no gas is present in the mixing vessel. Hence when catalyst slurry is transferred to the polymerization reactor, thereby ensuring that no or almost no gas will be transferred from the mixing vessel to the polymerization reactor. This has the advantage that the pumping process is more efficient and reduces damage to the pumps, making the catalyst slurry transfer more accurate. Even more, as the supply of gasses into the polymerization reactor is minimized this has a positive effect on the polymerization process, hence improving efficiency of the polymerization process as a whole and the properties of the produced polymers. It should further be noticed that another benefit of the present system is that it maintains and even improves catalyst activity and therefore also improves efficiency of the catalyst itself. By providing a mixing vessel with a pressure regulating the vessel less likely be subjected to large pressure build up or vacuum conditions, and therefore there is no need to fortify the mixing vessel to sustain such conditions. This reduces investment costs and makes the catalyst slurry preparation process as a whole much efficient.

The present invention therefore provides a method for preparing a catalyst slurry and supplying said catalyst slurry to an ethylene polymerization loop reactor, said catalyst slurry comprising solid catalyst and a liquid hydrocarbon diluent, wherein said method comprises the steps of:
  (a) providing a feed of concentrated catalyst slurry to a mixing vessel by means of a feeding device;
  (b) diluting said concentrated catalyst slurry in a suitable amount of said diluent in a mixing vessel thereby obtaining a diluted catalyst slurry having a concentration suitable for use in an ethylene polymerization reaction; and
  (c) transferring said diluted catalyst slurry from said mixing vessel to said ethylene polymerization loop reactor;
characterized in that the method comprises the step of maintaining said mixing vessel essentially free of a gaseous phase by regulating the pressure in said mixing vessel by means of at least one pressure regulating unit comprising a pulsation dampener.

As used herein the term "feed of concentrated catalyst slurry" refers to a feed of catalyst slurry which is transferred to the mixing vessel. This is a concentrated form of the catalyst slurry and upon transfer of this concentrated catalyst slurry additional diluent is added to the concentrated catalyst slurry thereby diluting it to a suitable concentration for transfer towards the polymerization reactor. The term "diluted catalyst slurry" therefore refers to the catalyst slurry in the mixing vessel. The term "concentrated catalyst slurry" refers to a composition comprising catalyst solid particles that are in suspension in a diluent whereby the concentration of catalyst is at least higher than 10% by weight. The term "diluted catalyst slurry" refers to a composition comprising catalyst solid particles that are in suspension in a diluent, whereby the concentration of catalyst is lower than or equal to 10% by weight.

In particular said feeding device comprises at least one mud pot for containing a concentrated catalyst slurry and at least one conduit operably connected to said mixing vessel and to said mud pot for transferring said concentrated catalyst slurry from said mud pot to said mixing vessel. Hence, according to a specific embodiment, the invention provides that step (a) comprises the steps of:
  (a1) providing concentrated catalyst slurry in a mud pot; and
  (a2) transferring said concentrated catalyst slurry from said mud pot to a mixing vessel through a conduit.

An important feature of the present invention is that the pressure in the mixing vessel is chosen such that the mixing vessel is essentially free of a gaseous phase. The term "essentially free of a gaseous phase" therefore refers to a state of the mixing vessel wherein maximal amount of gas in the mixing vessel is at most 5% of the vessel volume, preferably at most 4%, at most 3%, at most 2%, at most 1% or at most 0.5% and most preferably at most 0.1% of the vessel volume.

Alternatively one might define that the pressure in the mixing vessel is chosen such that the mixing vessel is in a liquid full state. With liquid full state is meant that the mixing vessel is completely full with liquid, having no head space of compressible gas. The liquid full state of the mixing vessel refers to a situation wherein the total wetted surface is 95% or more of the total inner surface of the mixing vessel, preferably 96%, 97%, 98%, 99% or more of the total inner surface of the mixing vessel and most preferably 100% of the total inner surface of the mixing vessel. As used herein, "wetted surface" is the inner surface of the mixing vessel which is in direct contact with the liquid inside the vessel, i.e. the catalyst slurry. By maintaining the mixing vessel liquid full and providing the mixing vessel with a pressure regulating unit it is also possible to feed diluent at a higher pressure into the mixing vessel.

In an embodiment, the present method comprises the step of regulating the pressure in said mixing vessel at a pressure which is below the pressure of the reactor, and which is higher than the vapour pressure of said diluted catalyst slurry. By regulating the pressure within the mixing vessel, the pressure can be maintained above the vapour pressure of said diluted catalyst slurry. By maintaining the pressure inside the mixing vessel close to but above the vapour pressure of the diluted catalyst slurry, control of the pressure in the mixing vessel is improved. Preferably, the diluted catalyst slurry in the mixing vessel is maintained at a temperature of about 20-30° C. At this temperature catalyst slurry diluted in isobutane diluent will have a vapour pressure below 3 bar.

In another embodiment, the present method comprises the step of maintaining the pressure in said mixing vessel during the preparation of said diluted catalyst slurry at a pressure which is lower than the pressure in said feeding device, e.g. a mud pot, for concentrated catalyst slurry and wherein the pressure in said feeding device, e.g. a mud pot, for concentrated catalyst slurry is lower than the pressure in said ethylene polymerization loop reactor.

In yet another embodiment, the invention provides that the method comprises the step of maintaining the pressure in said mixing vessel at a pressure which is below 35 bar, preferably below 20 bar, preferably below 17 bar. Another embodiment of the present invention relates to a method characterized by maintaining said diluted catalyst slurry in said mixing vessel at a pressure comprised between 3 and 35 bar and maintaining said concentrated catalyst slurry in said feeding device, e.g. a mud pot, at a pressure comprised between 5 and 35 bar.

Preferably the invention provides that the pressure of said diluted catalyst slurry in said mixing vessel is preserved at a pressure comprised between 3 and 35 bar, preferably between 3 and 17, preferably between 4 and 8 bar and for instance at 4, 5, 6 7 or 8 bar. The pressure of said concentrated catalyst slurry in said mud pot is preserved at a pressure comprised between 5 and 35 bar, preferably between 5 and 25 bar, preferably between 5 and 17 bar, preferably between 8 and 12 bar and for instance at 8, 9, 10, 11 or 12 bar. By maintaining the pressure inside the feeding device, e.g. mud pot, higher than the pressure inside the mixing vessel, the feed of catalyst slurry from the feeding device, e.g. mud pot, to the mixing vessel occurs automatically through the pressure, and no pumping is required. Furthermore, the feed at increased pressure ensures permits concentrated catalyst slurry to be injected into the mixing vessel and to distribute well through it.

In a preferred embodiment pressure inside the ethylene polymerization loop reactor is preserved at a pressure between 40 and 65 bar. This pressure is necessary for the polymerization reaction to occur and the lower pressures inside the feeding device/mud pot(s) and mixing vessel, reduces leakage to the polymerization reactor.

In another embodiment, the present method comprises the step of keeping said pressure in said mixing vessel at a substantially constant level during the preparation of said diluted catalyst slurry and/or during the supply of said diluted catalyst slurry to said ethylene polymerization loop reactor.

According to specific embodiments the catalyst that can be prepared in supplied in accordance with the present invention is a metallocene catalyst, a chromium catalyst or a Ziegler-Natta catalyst.

In a preferred embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \quad (I); or$$

$$R''(Ar)_2MQ_2 \quad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and wherein R" is a divalent group or moiety bridging the two Ar groups and selected from the group consisting of a C1-C20 alkylene, a germanium, a silicon, a siloxane, an alkyiphosphine and an amine, and wherein said R" is optionally substituted with one or more substituents each independently selected from the group comprising a hydrocarbyl having 1 to 20 carbon atoms and wherein said hydrocarbyl optionally contains one or more atoms selected from the group comprising B, Si, S, O, F and P.

The term "hydrocarbyl having 1 to 20 carbon atoms" as used herein is intended to refer to a moiety selected from the group comprising a linear or branched C1-C20 alkyl; C3-C20 cycloalkyl; C6-C20 aryl; C7-C20 alkylaryl and C7-C20 arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, chlorine is preferred.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl)zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl)zirconium dichloride.

The metallocene catalysts generally are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

In another embodiment of the present invention, said catalyst is a chromium catalyst. The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

In another embodiment of the present invention, said catalyst is a Ziegler-Natta catalyst. The term "Ziegler-Natta catalyst" or "ZN catalyst" refers to catalysts having a general formula $M^1X_v$, wherein M is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, TiCl4. Suitable ZN catalysts for use in the invention are described in U.S. Pat. No. 6,930,071 and U.S. Pat. No. 6,864,207, which are incorporated herein by reference.

The present invention further relates to a system for preparing a catalyst slurry and supplying catalyst slurry to an ethylene polymerization loop reactor, said catalyst slurry consisting of solid catalyst and liquid hydrocarbon diluent, comprising:
  a feeding device for feeding concentrated catalyst slurry to a mixing vessel;
  a mixing vessel comprising a catalyst slurry, preferably a diluted catalyst slurry, said mixing vessel being free of a gaseous phase (i.e. full of catalyst slurry);
  at least one conduit operably connected to said mixing vessel and to said ethylene polymerization loop reactor for transferring said diluted catalyst slurry from said mixing vessel to said ethylene polymerization loop reactor,
characterized in that said system is further provided with at least one pressure regulating unit for maintaining said mixing vessel essentially free of a gaseous phase, wherein said pressure regulating unit comprises a pressure controlling valve, a pressure measuring device and a pulsation dampener.

As used herein the term "pressure regulating unit(s)" or "pressure regulating means" refers to pressure regulators which permit to maintain the pressure inside a mixing vessel at a relatively constant level. The pressure regulating units enable both the increase and decrease of the pressure when the pressure inside the mixing vessel is respectively lower or higher then a set pressure value. According to the invention, said pressure regulating unit comprises a pulsation dampener. Preferably said pressure regulating unit comprises a pressure controlling valve, a pressure measuring device and a pulsation dampener. The pulsation dampener enables the pressure regulating unit to control the pressure in the mixing vessel whereas the pressure measuring device provides a pressure measurement and the pressure controlling valve provides that no contaminating liquids enter the pressure regulating unit.

In a preferred embodiment of the present invention said feeding device comprises at least one mud pot for containing a concentrated catalyst slurry and at least one conduit operably connected to said mixing vessel and to said mud pot for transferring said concentrated catalyst slurry from said mud pot to said mixing vessel.

In another embodiment of the present invention said mixing vessel is provided with at least one pressure regulating unit either directly connected to said mixing vessel, or said pressure regulating unit is connected via a conduit to said mixing vessel. In an embodiment, a pressure regulating unit is connected to said mixing vessel by means of a pressure regulating conduit extending vertically from a top of said mixing vessel, whereby said pressure regulating conduit is provided at one end with an aperture opening into said mixing vessel, and is provided at the opposite end with another aperture opening into said pressure regulating unit. By providing a pressure regulating conduit extending vertically from a top of said mixing vessel onto which the pressure regulating means are provided, the pressure regulating unit do not come into contact with the catalyst slurry inside the mixing vessel and hence stay clean and are not contaminated with the catalyst slurry.

Alternatively or in combination therewith, the mixing vessel may be provided at its top with a substantially vertically positioned conduit connecting said pulsation dampener to said mixing tank.

In a preferred embodiment, a system is provided wherein said pressure regulating conduit comprises a progressive cavity pump. A progressive cavity pump enables the transfer of fluid by means of the progress, through the pump, of a sequence of small, fixed shape, discrete cavities, as its rotor is turned. This leads to the volumetric flow rate being proportional to the rotation rate and to low levels of shearing being applied to the pumped fluid. The use of a progressive cavity pump is advantageous for pumping a diluent comprising catalyst particles, particularly if the catalyst is provided on a carrier such as a silica-carrier. It reduces maintenance costs and provides low flow pulsing.

In another embodiment, a system is provided wherein said conduit for transferring said concentrated catalyst slurry from a mud pot to said mixing vessel is provided with at least one pressure regulating unit. In a preferred embodiment, said conduit for transferring said concentrated catalyst slurry from said mud pot to said mixing vessel is provided with flushing means which is connected to said pressure regulating unit(s). The presence of flushing means onto the pressure regulating unit(s) ensures that, in case catalyst slurry contaminates the pressure regulating unit(s) these can be cleaned using the flushing means without affecting the catalyst preparation. The flushing at this stage allows diluting the catalyst concentration while at the same time compensating for catalyst slurry with is pumped to the reactor.

In a preferred embodiment the present invention relates to a system wherein said pressure regulating units comprise pulsation dampeners. As referred to herein a "pulsation damper" is a specific pressure regulator well known in the art having a separation membrane enabling volume variability. The present invention therefore also relates to the use of a pulsation dampener for the pressure regulation of a mixing tank full of a diluted catalyst slurry. The pulsation dampener allows a precise regulation of the pressure in a liquid full mixing vessel. Furthermore, when a liquid, such as a diluent is fed into the mixing vessel at a high pressure, the pressure regulating unit(s), and preferably the pulsation dampener, compensate the increase in pressure, thereby providing that no pressure is build up inside the mixing vessel. On the opposite, when liquid is withdrawn from the mixing vessel, the pressure regulating unit(s), and preferably the pulsation dampener, will ensure that there is no loss of pressure within the mixing vessel.

Figure 2:
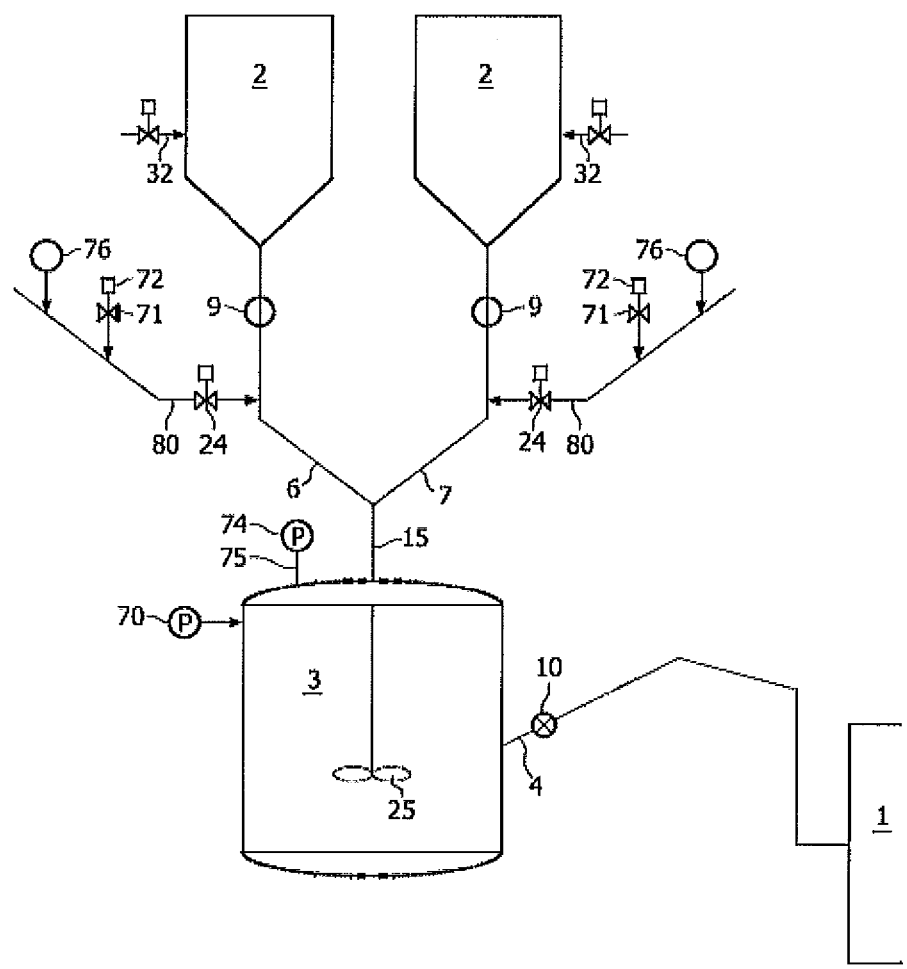
FIG. 2 schematically illustrates another embodiment of a catalyst slurry preparation system for preparing and feeding catalyst slurry to an ethylene polymerization reactor.
Figure 3:
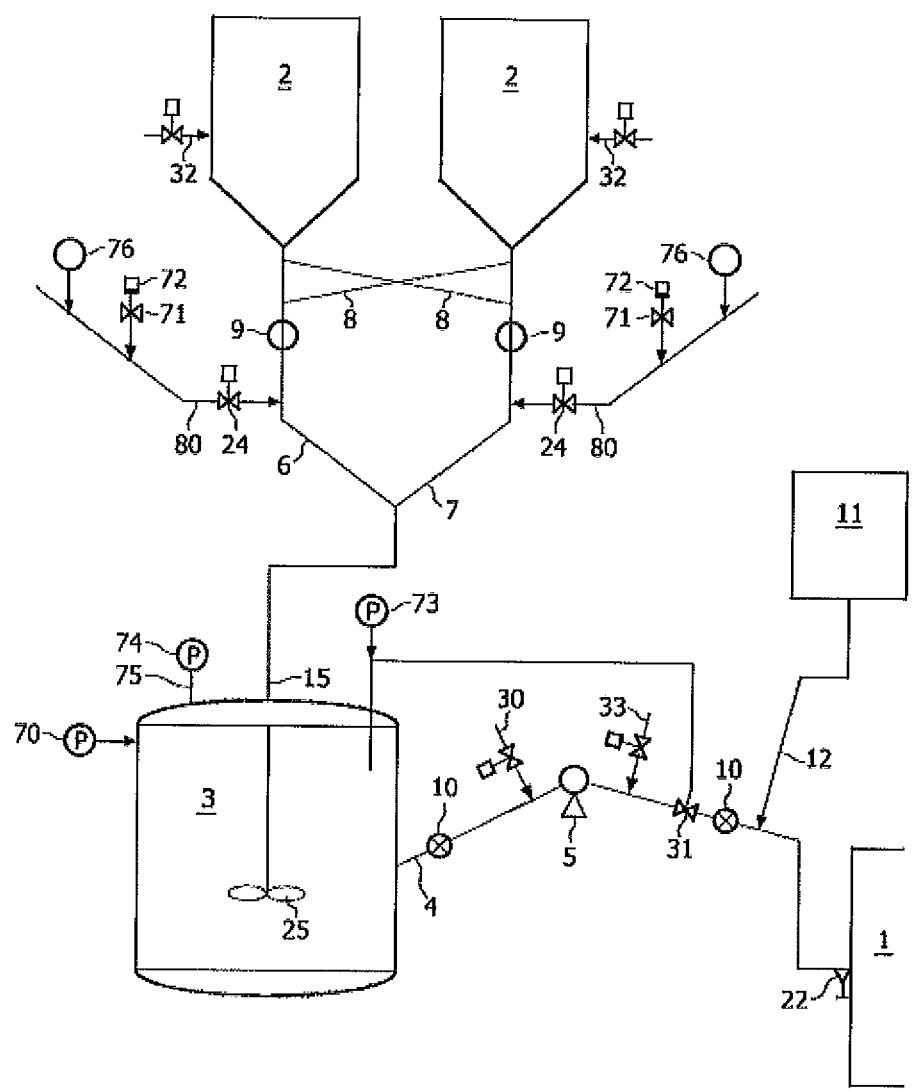
FIG. 3 schematically illustrates another embodiment of a catalyst preparation system for preparing and feeding catalyst slurry to an ethylene polymerization reactor.

Non-limiting examples of catalyst slurry preparation systems according to the present invention are for instance illustrated in FIGS. 1, 2 and 3.

According to FIG. 1 a catalyst slurry preparation system according to an embodiment of the invention comprises a mud pot 2 wherein concentrated catalyst slurry is prepared. Catalyst slurry can be prepared by providing dry catalyst from a catalyst supply vessel (not shown) to said mud pot and by adding a suitable amount of diluent to the mud pot through an injection valve 32. Once prepared the concentrated catalyst slurry is transported through conduits 6 and 15 to a mixing vessel 3, wherein the catalyst slurry is diluted to a concentration suitable for use in a polymerization reaction. Conduit 6 may be provided with a catalyst slurry feeder 9 for dosing the feed of catalyst slurry to the mixing vessel 3 and an injection valve 24 and injection conduit 80 for the injection of diluent. The mixing vessel 3 is provided with mixing means 25 (e.g. impeller blades provided on a rotatable shaft). In addition, the system further comprises a conduit 4 which connects the mixing vessel 3 to a polymerization reactor 1. The conduit 4 may be provided with flushing means (not shown), a pumping means (not shown) such as e.g. a pump and flow measuring means 10, such as e.g. a coriolis meter. The diluted catalyst slurry is pumped through this conduit 4 from said mixing vessel 3 to the reactor 1. The mixing vessel 3 is further provided with a pressure regulating unit which comprises a pressure controlling valve, a pressure measuring device and a pulsation dampener. The pressure regulating unit is provided onto different locations of the catalyst slurry preparation system. As illustrated, a pressure regulating unit 70 is positioned directly onto the mixing vessel 3, a pressure regulating unit comprising a pressure controlling valve 71, a pressure measuring device 72 and a pulsation dampener 76 are positioned onto the injection conduit 80, and a pressure regulating unit 74 is positioned onto a pressure regulating conduit 75 extending vertically from a top of said mixing vessel 3. In an embodiment not shown said pressure regulating unit 74 is directly connected to said mixing vessel 3.

FIG. 2 schematically represents a catalyst slurry preparation system which is similar to the preparation system of FIG. 1 with the difference that it comprises two mud pots 2 containing concentrated catalyst slurry. Both mud pots are provided with an injection valve 32 for the addition of diluent into the mud pots 2. Conduits 6, 7 and 15 connect the mud pots 2 with a mixing vessel 3, wherein the catalyst slurry is diluted to a concentration suitable for use in a polymerization reaction. Conduit 6 and 7 are provided with catalyst slurry feeders 9 for dosing the feed of catalyst slurry from the mud pots 2 to the mixing vessel 3 and injection valves 24 for the injection of diluent. The mixing vessel 3 is provided with mixing means 25 (e.g. impeller blades provided on a rotatable shaft). The diluted slurry is then pumped through conduit 4 in a polymerization reactor 1. To that end the conduit 4 which connects the mixing vessel 3 to the polymerization reactor 1, is provided with pumping means. The conduit 4 may be further provided with diluent flushing means and flow measuring means 10, such as e.g. a coriolis flow meter. The mixing vessel 3 is provided with pressure regulating units which are provided at different locations: a pressure regulating unit 70 is provided positioned directly onto the mixing vessel 3; a pressure regulating unit comprising a pressure controlling valve 71, a pressure measuring device 72 and a pulsation dampener 76 is provided on conduit 80; and a pressure regulating unit 74 is provided on a pressure regulating conduit 75, which extends vertically from a top of said mixing vessel 3.

According to FIG. 3 a catalyst slurry preparation system according to an embodiment of the invention is provided that comprises two mud pots 2 containing concentrated catalyst slurry. Both mud pots 2 are provided with an injection valve 32 for feeding diluent to the mud pots 2. Conduits 6, 7 and 15 connect the mud pots 2 with a mixing vessel 3, wherein diluted catalyst slurry is stored. In the case illustrated in FIG. 3 wherein two mud pots 2 are provided, each having a conduit 6 or 7, the conduit 6 for transferring said catalyst slurry from a first mud pot 2 to a mixing vessel 3 is interchangeable with a second conduit 7 for transferring said catalyst slurry from a second mud pot 2 to a mixing vessel 3 through lines 8 connecting said first 6 with said second 7 conduit. Such interconnection 8 permits, in case of interruption of transfer through one conduit 6, to discharge the catalyst slurry to the mixing vessel 3 through a second conduit 7. Conduit 6 and 7 may be provided with catalyst slurry feeders 9 for dosing the feed of catalyst slurry from the mud pots 2 to the mixing vessel 3. The conduits 6, 7 are further provided with injection valves 24 for the injection of diluent. The mixing vessel 3 is provided with mixing means 25. The conduit 4, as illustrated on FIG. 3, is further provided with safety valves and diluent flushing means 30, 33, either at the inlet, at the outlet or at both sides of the pumps 5. Diluent flushing means 30, 33 enable to flush diluent such as isobutane through the conduit 4 and to keep the conduit 4 and the pumping means 5 unplugged. In addition, the conduit 4 is further provided with flow measuring means 10 for easily measuring the catalyst flow rate in the conduit 4. These flow measuring means 10 preferably are Coriolis flow meters that can be provided upstream and downstream from said pumps 5. Conduit 4 may be further provided with a conduit and valve 31 for by-passing the pump 5. The conduits 4 for transferring catalyst slurry into to the reactor may also be equipped by one or more valves, preferably piston valves 22. The piston valves 22 are capable of sealing the orifice by which the conduit 4 is connected to the reactor 1. The mixing vessel 3 is further provided with pressure regulating units. The pressure regulating units are provided onto different locations of the system; a pressure regulating unit 70 is connected directly to the mixing vessel 3; a pressure regulating unit comprising a pressure controlling valve 71, a pressure measuring device 72 and a pulsation dampener 76 is provided on conduit 80; a pressure regulating unit 74 is positioned onto conduit 75 extending vertically from a top of said mixing vessel 3; and a pressure regulating unit 73 is positioned onto the conduit for by-passing the pump 5.

A catalyst slurry preparation system according to the invention may further comprise a feeding system for an activating agent as illustrated on FIG. 3. As used herein the term "activating agent" refers to materials that can be used in conjunction with a catalyst in order to improve the activity of the catalyst during the polymerization reaction. Catalyst activating agents are well known in the art and will therefore not be discussed into detail herein. As illustrated on FIG. 3, a feeding system for an activating agent may comprise a storage vessel 11 for storing said activating agent and a conduit 12 intersecting the conduit 4.

A method for preparing catalyst slurry in a catalyst slurry preparation system and supplying catalyst slurry to an ethylene polymerization loop reactor as provided herein is also particularly suitable to be integrated in an ethylene polymerization process, as it permits to provide substantially clean catalyst slurry to a polymerization reactor, and as such influences/improves polymerization conditions, and the quality and the properties of the prepared polymers. Therefore, the invention relates in another aspect to a method for the polymerization of ethylene in an ethylene polymerization loop reactor, comprising the steps of:

preparing a catalyst slurry in a catalyst slurry preparation system as described herein, and preferably a catalyst slurry preparation system comprising at least one mud pot which is operably connected to a mixing vessel by means of at least one conduit;

feeding ethylene monomer, a diluent, said catalyst slurry, optionally hydrogen, and optionally one or more co-monomer(s) to said ethylene polymerization loop reactor;

polymerizing one or more ethylene monomers to produce a polyethylene slurry comprising liquid diluent and solid polyethylene particles, and recovering polyethylene particles from the polyethylene slurry, characterized in that said catalyst slurry is prepared and supplied to said reactor according to a method or system as described herein. In another preferred embodiment a method is provided wherein said catalyst is a metallocene catalyst, chromium catalyst or Ziegler-Natta catalyst, as defined herein, preferably said catalyst is a metallocene catalyst.

As used herein the term "ethylene polymerization reaction" refers to the polymerization reaction of ethylene which is performed by feeding to a reactor reactants including ethylene monomer, a diluent, a catalyst in the form of catalyst slurry, an activating agent, optionally a co-monomer, and optionally a terminating agent such as hydrogen. The polymerization reaction of ethylene may for instance be carried out in loop reactors. Suitable "ethylene polymerization" includes but is not limited to homo-polymerization of ethylene or the co-polymerization of ethylene and a higher 1-olefin co-monomer such as butene, 1-pentene, 1-hexene, 1-octene or 1-decene.

As used herein the term "co-monomer" refers to co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

Hydrocarbon diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

An ethylene polymerization reaction as described herein can be carried out in a single loop reactor or in a double loop reactor, i.e. in two serially connected loop reactors, wherein in the latter case bimodal polyethylene can be prepared. According to another embodiment the invention therefore provides a method wherein said ethylene polymerization loop reactor, as used in any of the methods according to the present invention, is a single loop reactor. In another embodiment, the invention therefore provides a method wherein a bimodal polyethylene product is prepared in at least two slurry loop reactors connected in series; and wherein catalyst supply is carried out in accordance with the present invention to a first and/or second reactor of a double loop reactor. Hence, according to an embodiment, the present invention relates to the method wherein said ethylene polymerization loop reactor is a loop reactor of a double loop reactor to which catalyst slurry is to be supplied.

EXAMPLE

A catalyst slurry was prepared in a mixing tank operated under liquid full conditions. The mixing tank was provided with a pressure regulating unit without a pulsation dampener. When the catalyst metering was stopped, high pressure was observed several times, with spilled isobutane through pressure safety valves, due to day and night temperature differences. After installation of a pulsation dampener, this pressure increase was no longer observed and loss of isobutane was prevented.

The invention claimed is:

1. A method for preparing a catalyst slurry and supplying said catalyst slurry to an ethylene polymerization loop reactor, said catalyst slurry comprising solid catalyst and a liquid hydrocarbon diluent, wherein said method comprises the steps of:

(a) feeding concentrated catalyst slurry to a mixing vessel;

(b) diluting said concentrated catalyst slurry in a suitable amount of said liquid hydrocarbon diluent in the mixing vessel thereby obtaining a diluted catalyst slurry having a concentration suitable for use in an ethylene polymerization reaction; wherein said mixing vessel is provided with at least one first pressure regulating unit, wherein said first pressure regulating unit comprises a pulsation dampener; and (c) transferring said diluted catalyst slurry from said mixing vessel to said ethylene polymerization loop reactor;

characterized in that the method comprises the step of maintaining said mixing vessel essentially free of a gaseous phase by regulating pressure in said mixing vessel using said at least one first pressure regulating unit comprising the pulsation dampener.

2. The method according to claim 1, wherein the method comprises the step of regulating the pressure in said mixing vessel at a pressure which is below a pressure of the ethylene polymerization loop reactor, and which is higher than a vapour pressure of said diluted catalyst slurry.

3. The method according to claim 1, wherein the catalyst slurry is fed to the mixing vessel via a feeding device, wherein the method comprises the step of maintaining said diluted catalyst slurry in said mixing vessel at a pressure between 3 and 35 bar and maintaining said concentrated catalyst slurry in said feeding device at a pressure between 5 and 35 bar.

4. The method according to claim 1, wherein said at least one first pressure regulating unit is positioned directly onto the mixing vessel.

5. The method according to claim 1, wherein the catalyst slurry is fed to the mixing vessel via a feeding device, wherein said feeding device comprises at least one mud pot for containing the concentrated catalyst slurry and at least one conduit operably connected to said mixing vessel and to said mud pot for transferring said concentrated catalyst slurry from said mud pot to said mixing vessel.

6. The method according to claim 5, wherein said conduit for transferring said concentrated catalyst slurry from said mud pot to said mixing vessel is provided with at least one second pressure regulating unit.

7. The method according to claim 6, wherein said conduit for transferring said concentrated catalyst slurry from said mud pot to said mixing vessel is provided with flushing means which is connected to said second pressure regulating unit.

8. The method according to claim 1, wherein said catalyst is a metallocene catalyst.

9. A system for preparing a catalyst slurry and supplying the catalyst slurry to an ethylene polymerization loop reactor, said catalyst slurry consisting of solid catalyst and liquid hydrocarbon diluent, comprising:
conduit for feeding concentrated catalyst slurry to a mixing vessel; wherein said mixing vessel is provided with at least one first pressure regulating unit connected therewith and wherein said first pressure regulating unit comprises a pulsation dampener for maintaining said mixing vessel essentially free of a gaseous phase;
at least one conduit operably connected to said mixing vessel and to said ethylene polymerization loop reactor for transferring diluted catalyst slurry from said mixing vessel to said ethylene polymerization loop reactor.

10. The system according to claim 9, wherein said first pressure regulating unit further comprises a pressure controlling valve and a pressure measuring device.

11. The system according to claim 9, wherein said conduit for feeding the concentrated catalyst slurry is a portion of a feeding device, wherein the feeding device further comprises at least one mud pot for containing the concentrated catalyst slurry, wherein the conduit is operably connected to said mixing vessel and to said mud pot for transferring said concentrated catalyst slurry from said mud pot to said mixing vessel.

12. The system according to claim 9, wherein said at least one first pressure regulating unit is positioned directly onto the mixing vessel.

13. The system according to claim 11, wherein said conduit for transferring said concentrated catalyst slurry from said mud pot to said mixing vessel is provided with at least one second pressure regulating unit.

14. The system according to claim 13, wherein said conduit for transferring said concentrated catalyst slurry from said mud pot to said mixing vessel is provided with flushing means which is connected to said second pressure regulating unit.

15. The system of claim 9, wherein the first pressure regulating unit is capable of increasing and decreasing the pressure in the mixing vessel.

16. The system of claim 10, wherein the pulsation dampener enables the first pressure regulating unit to increase and decrease the pressure in the mixing vessel, wherein the pressure measuring device provides a measurement of the pressure in the mixing vessel, and wherein the pressure controlling valve prevents contaminating liquids from entering the first pressure regulating unit.

17. The system of claim 10, wherein the first pressure regulating unit is connected to the mixing vessel via a pressure regulating conduit.

18. The system of claim 17, wherein the pressure regulating conduit extends vertically from a top of said mixing vessel and comprises a first aperture opening into said mixing vessel and a second aperture opening into said first pressure regulating unit.

19. The system of claim 9, wherein the first pressure regulating unit does not contact the catalyst slurry.

20. The system of claim 9, wherein a location at which the first pressure regulating unit fluidly communicates with the mixing vessel is spatially separated from a location at which the conduit for feeding the concentrated catalyst slurry fluidly communicates with the mixing vessel.

* * * * *